United States Patent [19]
Schuricht

[11] 3,837,452
[45] Sept. 24, 1974

[54] METHOD AND APPARATUS FOR CONVEYING WORKPIECES

[75] Inventor: Henry A. Schuricht, Pontiac, Mich.

[73] Assignee: Hydromation Filter Company, Livonia, Mich.

[22] Filed: Feb. 23, 1973

[21] Appl. No.: 335,207

[52] U.S. Cl.................... 193/12, 198/34, 198/136
[51] Int. Cl...................... B65g 11/06, B65g 11/20
[58] Field of Search............ 193/12, 13, 35 S, 43 A; 198/34, 136, 212

[56] References Cited
UNITED STATES PATENTS

| | | | |
|---|---|---|---|
| 1,090,948 | 3/1914 | Sklovsky et al............... | 198/136 X |
| 3,071,240 | 1/1963 | Graham et al.................. | 198/212 |
| 3,261,453 | 7/1966 | Hirs.................................. | 198/212 |
| 3,295,666 | 1/1967 | Kay et al.......................... | 198/212 |

*Primary Examiner*—Evon C. Blunk
*Assistant Examiner*—W. Scott Carson
*Attorney, Agent, or Firm*—Cullen, Settle, Sloman & Cantor

[57] ABSTRACT

A method and apparatus for conveying workpieces under the influence of gravity from an upper vertical level to a lower vertical level wherein the workpieces have exposed critical, e.g., machined, surfaces which must be protected from contact from other workpieces and from the conveying apparatus itself. A first track has a plurality of rolling separators mounted therein and a second track, adjacent and parallel to the first track is provided to support the workpieces by contacting non-critical portions thereof. The separators have projections which extend into the path of those workpieces in the second track. The separators are interposed between the workpieces, and the projections on the separators maintain the workpieces in a spaced-apart relationship and advance the workpieces along the second track. At the bottom of the second track, only the workpieces are discharged from the conveying apparatus and the separators are recirculated to the upper vertical level of the apparatus for reuse.

23 Claims, 5 Drawing Figures

PATENTED SEP 24 1974

METHOD AND APPARATUS FOR CONVEYING WORKPIECES

BACKGROUND OF THE INVENTION

This invention relates to a method and apparatus for transferring, storing and conveying workpieces under the influence of gravity.

Many manufacturing and assembling operations involve the conveying, handling and transferring of small workpieces or parts. In addition to the conveying of workpieces, it is often necessary to store the workpieces prior to their use in the manufacturing or assembling operation.

These workpieces, such as pistons, bearings, shafts, valves stems and the like, may have critical, highly machined exposed surfaces. In the transfer and conveyance of workpieces having highly machined surfaces, it is, of course, quite important that these surfaces are subjected to a minimal amount of contact with each other, as well as with the conveying apparatus, to avoid chipping and other damage.

Obviously, such chipping and other damage increases the number of workpieces which must be rejected and increases the need for inspection for damaged parts. To overcome these problems, it has been suggested to hand place these workpieces in special trays or containers. However, such manual operations are slower and more costly than automated equipment.

One apparatus for conveying workpieces between different vertical levers is set forth in the U.S. Pat. No. 3,261,453, to Hirs, wherein a revolving brush moves the workpieces along a helical storage unit.

The present invention is an improvement over the storage unit described in the aforesaid patent, because in the patent to Hirs the workpieces are free to jostle against one another.

An apparatus for reducing the impact upon workpieces is disclosed in my U.S. Pat. No. 2,890,780, wherein a series of bumpers are provided to lower the speed at which a workpiece is discharged. The present invention is an improvement over the low impact discharge and handling apparatus as described in my prior patent.

Specifically, many parts having highly machined exposed surfaces with a precise finish are fragile or irregular in shape and therefore cannot be moved in contact with each other as in the patent to Hirs and may not be utilized satisfactorily in a device having a series of bumpers as in the prior patent. When workpieces of these types are transferred, conveyed or stored, they may be subjected to extensive damage resulting from impact with the apparatus and jamming against each other.

SUMMARY OF THE INVENTION

The present invention contemplates a method and apparatus for storing, transferring and conveying workpieces under the influence of gravity, wherein the apparatus also includes means for maintaining the workpieces in a spaced-apart relationship. The apparatus includes a first stationary track mounted in a helical path to support and guide a plurality of movable separators and a second helical track, adjacent and parallel to the first track, to support and guide the workpieces as they move along a path from an upper level to a lower level.

The separators mounted in the first track each have a resilient, non-abrasive projection adapted to extend into the path of the workpieces as the workpieces move along the second track.

Means are provided for introducing or interposing the separators between each of the workpieces. Specifically, a gate in the first track oscillates to block and unblock the track. During each oscillation, one separator is released and interposed between workpieces. The separators move along the first track under the influence of gravity and maintain the workpieces in a spaced-apart relationship while advancing them along the second track. Another gate means is provided for similar oscillatory motion for removing the separators from contact with the workpieces. This discharges only the workpieces from the second track and the separators are recirculated to the upper level of the first track for reuse.

Thus, it is a primary object of the present invention to provide a new and improved method and apparatus for storing, transferring and conveying workpieces under the force of gravity, so that the workpieces are maintained in a spaced-apart relationship to reduce the possibility of damage during transfer and storage.

It is another object of the present invention to provide a method and apparatus for storing and conveying workpieces under the influence of gravity wherein the highly machined or finished exposed surfaces of the workpieces are not in contact with each other nor with the conveying apparatus.

It is yet another object of the present invention to provide a method and apparatus for transferring and conveying workpieces including means for maintaining the workpieces in a spaced-apart relationship and advancing them through the conveying apparatus wherein these means may be recirculated through the storing and conveying apparatus for reuse.

It is still another object of the present invention to provide a method and apparatus for storing and conveying workpieces wherein separators are used to maintain the workpieces in a spaced-apart relationship and to advance the workpieces from an upper level to a lower level with the separators being individually interposed between adjacent workpieces.

BRIEF DESCRIPTION OF THE DRAWINGS

The foregoing objects of the present invention, together with other objects and advantages which may be attained by its use, will become more apparent upon reading the following detailed description, taken in conjunction with the drawings.

In the drawings, wherein like reference numerals identify corresponding parts.

DETAILED DESCRIPTION OF THE INVENTION

Figure 1:
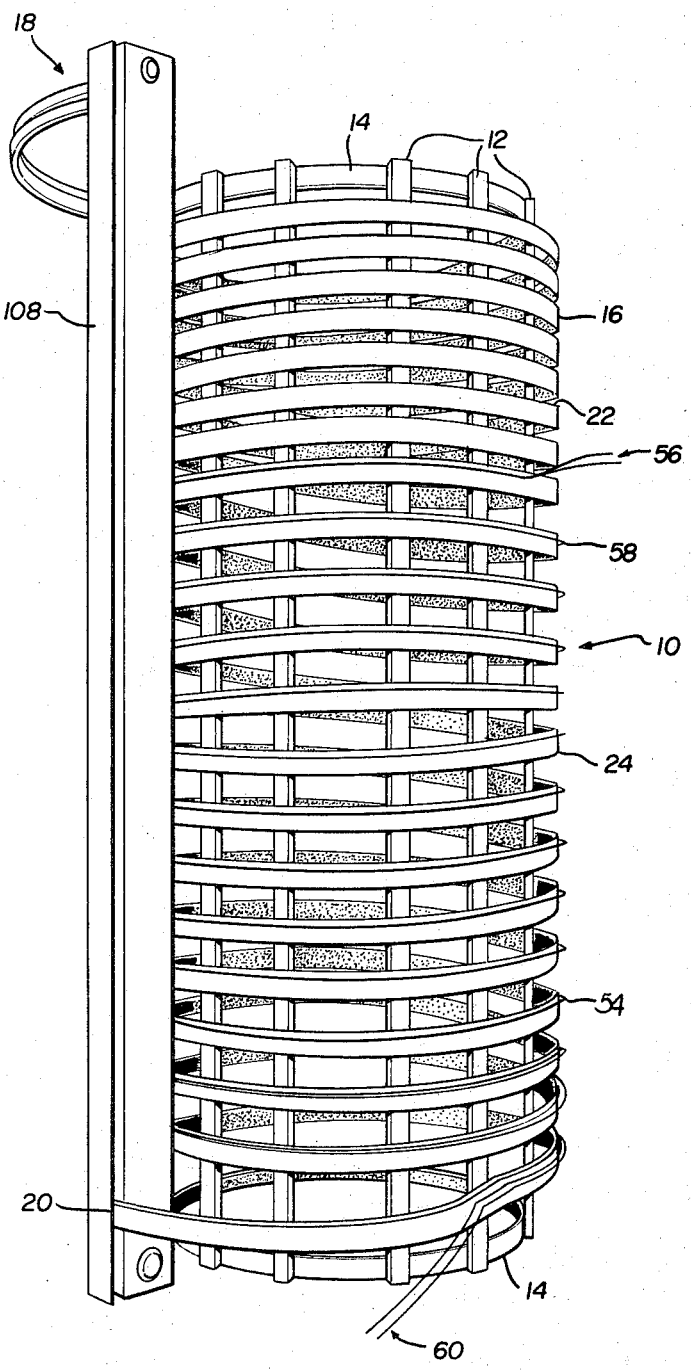
FIG. 1 is a perspective illustration of the overall workpiece conveying and storage system of the present invention.

In FIG. 1 there is illustrated a workpiece transfer and storage apparatus 10 according to the principles of the present invention including vertical support or frame members 12 and upper and lower circumferential frame members 14 thereby defining an overall cylindrical shape for the apparatus 10.

A first stationary track 16 is helically wound around the vertical frame members 12 from an upper inlet area 18 to a lower outlet area 20. The helical track 16 may include an upper track portion 22, of a first pitch, and a lower portion 24 of a second slightly greater pitch.

Figure 2:
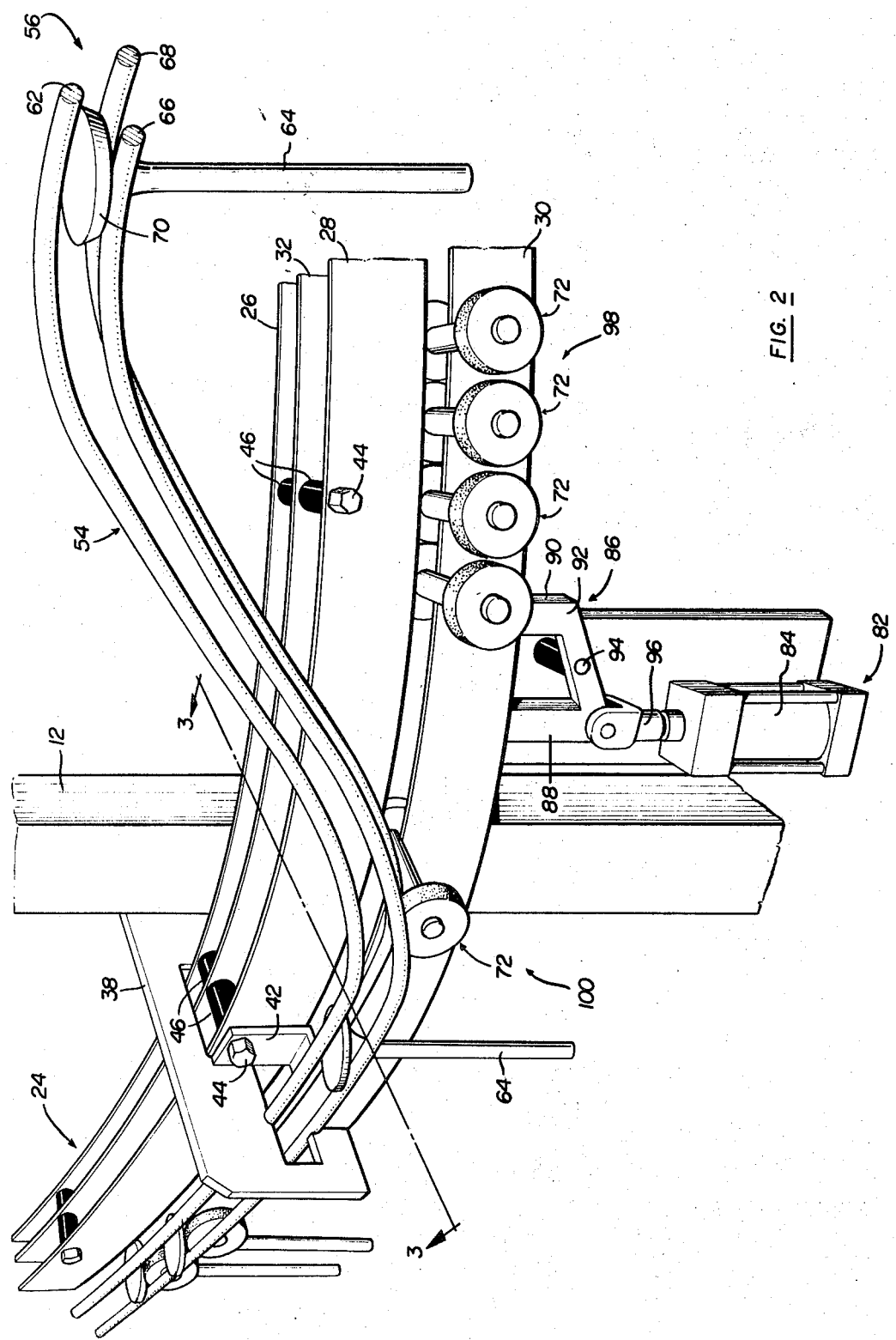
FIG. 2 is an enlarged perspective illustration of a portion of the storage and conveying means of the present invention illustrating various details including the apparatus for storing separators and for interposing separators between adjacent workpieces.
Figure 3:
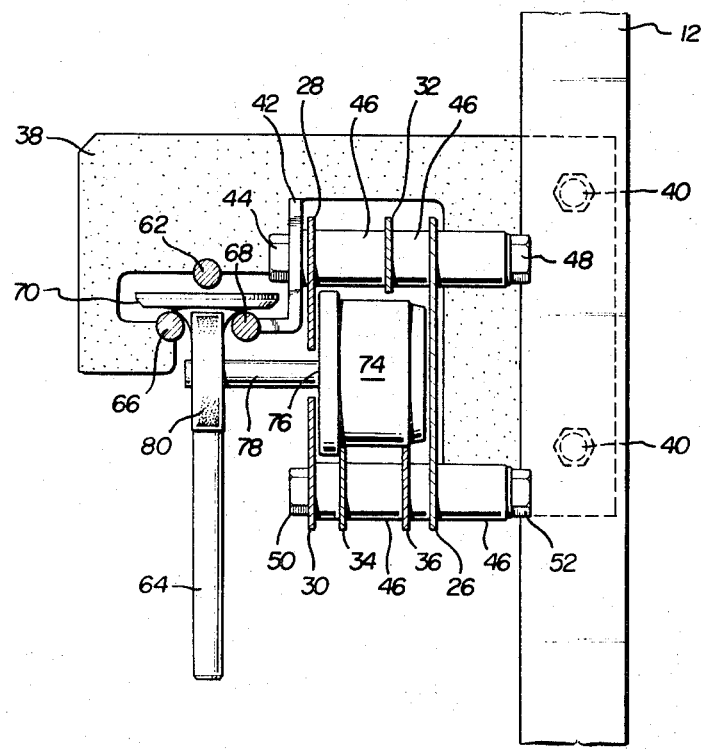
FIG. 3 is an end view of the track of the present invention taken in the direction of the arrows 3—3 of FIG. 2.
Figure 5:
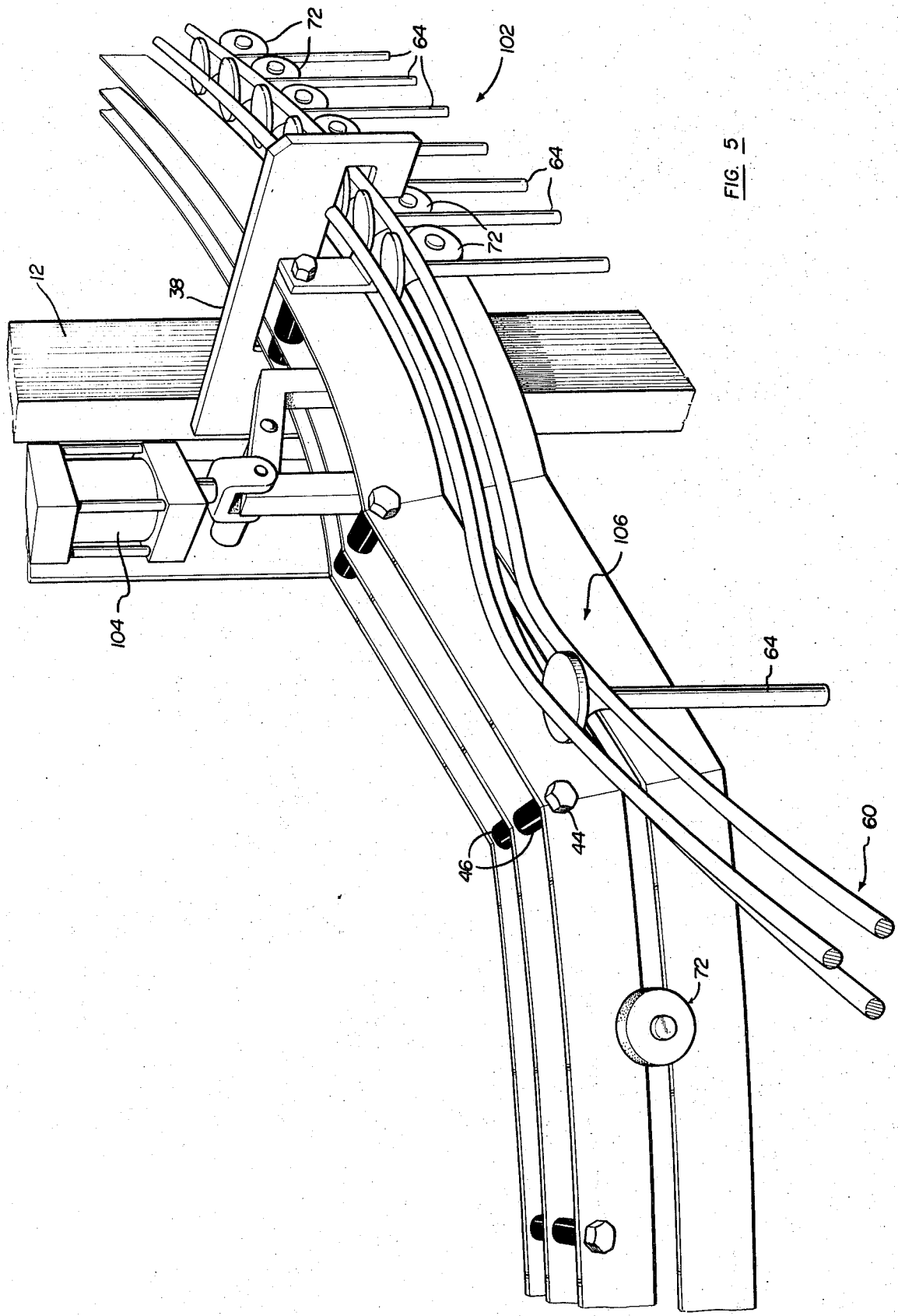
FIG. 5 is an enlarged perspective view of a portion of the storing and conveying means of the present invention illustrating in greater detail the storage of workpieces and the means for discharging workpieces from the apparatus.

FIGS. 2 and 3 illustrate, in greater detail, the structure of the first helical track 16. The track, which may be made of oil-hardened flat sheets of blue spring steel, includes a vertically disposed inner guide 26 and vertically disposed outer guides 28 and 30 which are spaced apart from each other and from the inner guide 26. The track further includes an upper wear surface 32 positioned between the outer guide 28 and the inner guide 26, and two lower wear surfaces 34, 36, both positioned between the outer guide 30 and the inner guide 26.

The track 16 is supported in its helical path on the vertical frame 12 by a plurality of flat, generally rectangular brackets 38 which are secured to the frame 12 by bolts 40. The brackets extend radially outward with respect to the circumferential frame members 14, and each bracket includes an integral L-shaped support 42 positioned perpendicular to the plate so that the long arm of the support is vertically disposed.

A nut and bolt combination together with spacers, are utilized to secure the guides and wear surfaces to the bracket and to maintain them in an appropriate spatial relationship. Specifically, nut 44 is inserted through an aperture in the long leg of the L-support 42, then through support apertures in the upper outer guide 28, the upper wear surface 32 and the top portion of the inner guide 26. Suitable spacers 46 are positioned on the bolt 44 to maintain the wear surface and guide in an appropriate spaced-apart relationship and the combination is secured by a nut 48. Similarly, another bolt 50 is inserted through the lower outer guide 30, wear surfaces 34, 36, and the inner guide 26 with appropriate spacers 46 and this combination is secured together by a nut 52. Thus, the inner guide 26 receives both the upper bolt 44 and the lower bolt 50.

The apparatus of the present invention also includes a second track 54 having an intake portion 56, an intermediate portion 58 and a discharge portion 60. The intermediate portion 58 is adjacent to substantially all of the lower track portion 24 of the first helical track 16. The intermediate portion of the second track is helically wound about the same axis as the first track, the second track being adjacent to and parallel to the lower track portion 24 and havin the same helical pitch.

The second helical track 54 includes a plurality of elongated rods of a circular cross section which are arranged in a generally triangular shape with the apex of the triangle uppermost. The upper rod 62 serves as a retainer for a workpiece 64 and the lower rods 66, 68 serve as guides or wear surfaces.

Workpiece 64 in the present invention is a valve stem having an exposed, finished surface 70. It is noted that the finished surface 70 of the workpiece 64 does not contact either the upper retainer rod 62 or the lower guide or wear rods 66, 68 of the second track. Obviously, the design of the second track is specific to the workpiece 64, and this design will be varied for different workpieces.

The second track 54 is secured to the vertical frame 12 such as by welding the upper rod 62 and the outer lower rod 66 to the bracket 38 and further by welding the inner lower rod 68 to the short arm of the L-support 42. In this manner, the triangular arrangement of the rods is maintained along the helical path.

Figure 4:
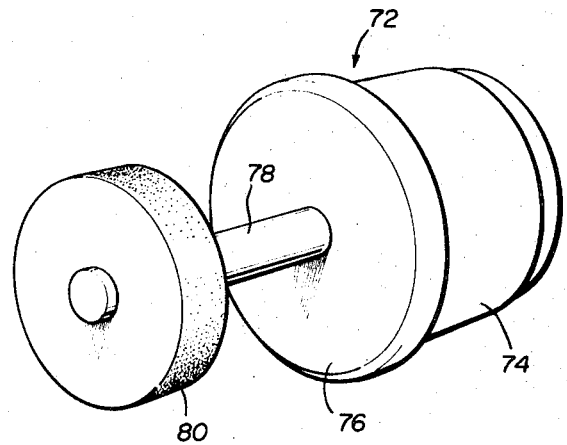
FIG. 4 is an illustration of one of the rollable separators of the present invention utilized to maintain the workpieces in a spaced-apart relationship and to advance them along the conveying means.

A plurality of rollable separators 72 are mounted in the first helical stationary track 16. FIG. 4 illustrates one roller separator 72, which may be made of cold rolled steel, and has a weighted cylindrical portion 74. One end of the cylindrical portion includes a guide wheel 76 of slightly larger diameter than the cylindrical portion 74. The separator includes an arm 78 projecting axially outward from the guide wheel 76 and having a cylindrical disk or wheel 80 attached thereto such as by welding.

The separators 72 enter the upper inlet 18 of the first stationary helical track 16 and move or roll through the upper track portion 22 under the influence of gravity. The mass of the weighted cylinder 74 and the pitch of the upper track portion 22 are adjusted to insure that the separators roll at a sufficient speed to avoid delays in the operation of the apparatus.

FIG. 3 illustrates the coaction between the separator 72 and the track 16. The side of the guide wheel 76 closest to the wheel 80 bears against the upper and lower outer guide members 28 and 30, and the opposite end of the weighted cylinder 74 moves against the inner guide 26. The weighted cylinder rolls along the wear surfaces 32, 34 and 36, and the guide wheel 76 runs between the wear surface 34 and the lower outer guide 30.

Means are provided for interposing the rollable separators 72 between adjacent workpieces 64 at the point where the second track converges in toward the first track. Specifically, a first gate means 82 includes a hydraulic cylinder 84 connected to a U-shaped member 86 having upright legs 88, 90 and a base 92. The legs and base may be formed as a single part, and the base has a central pivot 94. The cylinder 84 is connected through a link or cylinder arm 96 to a point common to the leg 88 and the base 92.

The gate means 82 is positioned below the first helical track 16 so that upon reciprocation of the cylinder 84, the legs 88 and 90 oscillate about the pivot 94 with the legs 88 and 90 alternately blocking the track 16. Thus, in a first position, leg 88 blocks the track while leg 90 is clear of the track. Upon activation of the cylinder to pivot the U-shaped member 86, leg 88 would be moved clear of the track while leg 90 blocks the track.

The width of the base 92 corresponds to the width of a separator 72. The rest position of the gate 82 is with the upstream leg 90 blocking the track 16.

As illustrated in FIG. 2, a plurality of separators 72 may be stored as at 98 just upstream of the upstream leg 90. When a workpiece 64 passes the gate area, an electrical control operates to reciprocate the cylinder 84. As the cylinder moves upward, the U-shaped member oscillates about the pivot 94 with leg 88 moving upward to block the path of the track 16 and leg 90 moving downward to permit a single separator 72 roll along the track a short distance until it contacts the leg 88. Upon the downward stroke of the cylinder 84, the U-shaped member 86 again oscillates so that leg 90 moves upward into the track to block movement of any additional separators while leg 88 oscillates downward to clear the path. This permits a separator 72 to enter the lower track portion 24 of the first helical track 16.

OPERATION

The entire cycle of operation of the present invention will now be explained. Separators 72 are introduced into the helical track 16 at the upper inlet 18 and roll along the upper track portion 22 under the influence of gravity. A plurality of workpieces 64 are supplied to the second track 54 at the intake portion 56. The intake portion 56 of the second helical track converges towards the first helical track 16 at the location of the gate means 82. With reference to FIG. 2, it is noted that rollable separators are stored as at 98 just upstream of this area of convergence 100. The area of convergence is where the pitch of the inner helical track 16 changes from one pitch to a greater pitch.

It is at this area of convergence where the rollable separators are interposed between adjacent workpieces. Specifically, in the manner just described, as each workpiece 64 passes through the area of convergence 100, the cylinder 84 oscillates the gate legs 88 and 90 to permit one separator to advance through the gate.

The projection on each separator 72 including the arm 78 and the wheel 80 extends into the path of travel of the workpieces 64. The diameter of the wheel 80 is greater than the diameter of a workpiece 64 so that the wheel 80 may maintain adjacent workpieces 64 in a spaced-apart relationship out of contact with subseqeunt workpieces.

The pitch of the lower portion 24 of the helical track 16 is greater so that the gravitational force on the separator 72 is sufficient to permit the separator to roll along the inner track 16 and to propel or advance the workpiece 64 along the outer helical track 54, throughout the intermediate portion 58 of the outer track. In this fashion, the projection on the separator 72 maintains the workpieces in a spaced-apart relationship and advances them along the second helical track from an upper vertical level to a lower vertical level.

At the bottom of the intermediate portion 58 of the outer helical track, which is substantially adjacent the bottom of the lower track portion 24 of the inner helical track 16, there is a storage area 102 where workpieces start to accumulate. It must be appreciated that the storage of workpieces and separators may take place from this area 102 upwards through the entire intermediate portion 58 of the outer track 54.

A second gate means 104 is positioned immediately downstream of the storage area 102. This gate 104 operates in the same fashion as the gate 82 to alternately block and unblock the helical track 16. The operation of this gate allows one separator at a time to pass therethrough which has the effect of removing one separator from between two adjacent workpieces thereby permitting one workpiece at a time to be discharged.

More specifically, as the workpieces are advanced by the separators, with the separators moving along the lower track portion 24 and the workpieces moving along the intermediate track portion 58, as the workpieces reach the storage area 102, they start to back-up along the helical track. When it is desired to release a single workpiece, the gate 104 is operated by reciprocating its cylinder to oscillate the legs thereby permitting a single separator to move through the gate. The wheel 80 of that separator which moves through the gate pushes a single workpiece 64 along the second track 54 to the discharge portion 60 of the second track.

The individual workpiece 64 is discharged along the second helical track 54 at the area 106 where the second track 54 diverges away from the lower portion of the first helical track 16. The workpieces 64 remains in the discharge portion 60 of the second track until they are removed for utilization in a manufacturing or assembling operation.

The separators which are individually released through the gate 104 continues to move under the influence of gravity through the lower track portion 24 to the lower track outlet 20. At this point, they are raised through an elevator 108 to the upper inlet 18 of the first helical track 16. In this fashion, the rollable separators are recirculated through the first helical track and may be reused.

The elevator 108 may be any one of those conventionally available and may even include a helical storage unit such as that described in the U.S. Pat. No. 3,261,453, to Hirs.

A flow of workpieces 64 is always in a downward direction so as to utilize gravity as the motivating force. While it may be appreciated that the tracks may move in a straight line, as long as they are adjacent and parallel, less floor space is utilized if the tracks follow a helical path.

The foregoing is a description of one embodiment of the present invention. This will be apparent to those skilled in the art that many modifications may be made without departing from the spirit and scope of the present invention. Therefore, the invention should be limited only by the following claims.

What is claimed is:

1. Apparatus for transferring workpieces from an upper vertical level to a lower vertical level under the influence of gravity, said workpieces having exposed surfaces which require the absence of contact with other workpieces and with said apparatus, said apparatus comprising:

a first stationary track means defining a first path from said upper level to said lower level for supporting and guiding a plurality of movable separators as they move along said first path under the influence of gravity;

a second stationary track means adjacent and parallel to said first track means, said second track means defining a second path from said upper level to said lower level for supporting and guiding a plurality of workpieces along said second path;

a plurality of individual independently moving separators mounted in said first track; and means for alternately feeding said separators and said workpieces to their respective track means;

each of said separators having a projection which extends into the second path for maintaining adjacent workpieces in a spaced apart relationship and for moving said workpieces along said second path.

2. The apparatus of claim 1 wherein each of said separators comprises:
a cylindrical body member mounted for rolling movement in said first track; and
an arm extending axially outward from one end of said body member and having a circular disk secured thereto;
said separators having a mass sufficient to cause said separators to roll along said first track and to propel said workpieces along said second track.

3. The apparatus of claim 1 and further including:
means positioned at said lower level for removing said separators from between each of said workpieces and for discharging only said workpieces from said second track with said separators remaining in said first track.

4. The apparatus of claim 3 and further including:
means for recirculating said separators from said lower level to said upper level.

5. The apparatus as defined in claim 1, wherein said individual independently movable separators are freely rolling from said upper level to said lower level.

6. A conveyor system for advancing workpieces in a spaced apart relationship along a stationary track, said track having an upper inlet portion, a lower outlet portion and an intermediate portion therebetween, said conveyor system comprising:
a first stationary guide means having a plurality of individual independently movable separators mounted therein for movement under the influence of gravity;
the intermediate portion of said stationary track being ajacent and parallel to said stationary guide means;
said movable separators having projections extending into the path of workpieces along the intermediate portion of said stationary track;
means for interposing the projection of one of said separators between adjacent workpieces at the top of the intermediate portion of said stationary track, whereby said separators maintain said workpieces in a spaced apart relationship and convey said workpieces by contact with said projections; and
means for removing said separators from between said workpieces at the bottom of said intermediate portion of said stationary track means.

7. The conveyor system as defined in claim 6 wherein said independently movable separators are freely rollable.

8. The conveyor system of claim 6 and further including:
means for recirculating said separators to a vertical level in said stationary guide means above the intermediate portion of said stationary track means.

9. The conveyor system of claim 6 wherein:
said upper inlet portion of said stationary track converges toward said stationary guide means;
said lower outlet portion of said stationary track diverges away from said stationary guide means;
said interposing means alternately merging the flow of workpieces and separators at the area where said track and guide means converge;
said removing means alternately separating the flow of workpieces and separators at the area where said track and guide means diverge; and
said separators always remaining in said guide means for recirculation and reuse.

10. The conveyor system of claim 6 wherein said interposing means comprises:
a generally "U"-shaped member having opposed legs connected by a base, said base having a pivot;
said legs being spaced apart a distance substantially equal to the width of a separator; and
means for oscillating said U-shaped member about said pivot each time a workpiece reaches the top of the intermediate portion of said track, for oscillation of the legs of the U-shaped member about the pivot for introducing only a single separator between adjacent workpieces and for storing unused separators in said guide means above the level of the intermediate portion of said track.

11. The conveyor system of claim 6 wherein said removing means comprises:
a generally "U"-shaped member having opposed legs interconnected by a base, said base having a pivot;
said legs being spaced apart a distance substantially equal to the width of a separator; and
means for oscillating said U-shaped member about said pivot each time a workpiece is to be discharged from the intermediate portion of said track, for oscillation of the legs of said U-shaped member about the pivot for discharging only a single workpiece at a time and further for storing workpieces along the intermediate portion of said track.

12. Apparatus for transferring workpieces from an upper vertical level to a lower vertical level under the influence of gravity comprising:
a first stationary helical track means defining an inner path from said upper level to said lower level for supporting and guiding a plurality of rollable separators as they move along said inner path under the influence of gravity;
a second stationary helical track means adjacent and parallel to said first helical track means for supporting and guiding a plurality of workpieces;
a plurality of rollable separators mounted in said first helical track;
means for interposing a single separator between adjacent workpieces at said upper level,
said separators including a cylindrical portion mounted in said first helical track and an axial projection extending into said second track for maintaining said workpieces in a spaced apart relationship and for propelling said workpieces along said second track;
means for removing said separators from between said workpieces at said lower level for discharging said workpieces from the maintaining and propelling influence of said separators;
said interposing means and said removing means each including a generally U-shaped member having two opposed legs connected by a base having an intermediate pivot; said legs being spaced apart a distance substantially equal to the width of a separator; and means for oscillating said U-shaped member about its pivot for alternately blocking said track with only one or the other of said legs; and means for recirculating said separators from said lower level to said upper level for reuse.

13. A conveyor system for transferring workpieces from an upper vertical level to a lower vertical level under the influence of gravity, said workpieces having exposed surfaces which require the absence of contact with other workpieces and with said system, said system comprising:

a first stationary helical track and an elevator defining a closed loop for supporting and guiding a plurality of separators;

said separators freely moving along said helical track from an upper level to a lower level under the influence of gravity;

a second stationary helical track adjacent and parallel to said first track and coaxially aligned therewith and defining a path from said upper level to said lower level for supporting and guiding a plurality of workpieces along said path;

said second track being convergent in toward said first track at said upper level and being divergent out from said first track at said lower level;

a plurality of individual separators mounted in said closed loop for freely and independently moving from said upper level to said lower level solely under the influence of gravity and for recirculation to said upper level in said elevator;

a gate positioned at the area of convergence of said tracks for interposing one separator between workpieces, each of said separators having a projection which extends into said path for maintaining the workpieces in a spaced-apart relationship and for advancing the workpieces from said upper level to said lower level; and a second gate positioned at the area of divergence of said tracks for removing said separators from between said workpieces and for discharging said workpieces from said second track with said separators rolling into said elevator for recirculation.

14. The conveyor system as defined in claim 13, wherein said separators are freely rollable along said first helical track.

15. A method for transferring workpieces along a first stationary track from an upper level to a lower level under the influence of gravity by moving said workpieces with rollable separators, each of said separators having a projection and being mounted in a second stationary track adjacent and parallel to said first track, comprising the steps of:

feeding and supporting said workpieces on said first stationary track;

supporting and guiding individual independently rollable separators on said second track; and interposing the projection of only one of said separators between adjacent workpieces at said upper level for maintaining said workpieces in a spaced-apart relationship and for conveying said workpieces by contact with said projections.

16. The method of claim 15 and further including the step of:

removing said separators at said lower level for discharging only said workpieces from said first track and retaining said separators in said second track.

17. The method of claim 16 and further including the step of:

recirculating said separators in said second track from said lower level to said upper level.

18. The method of claim 16 and further including the step of:

storing said rollable separators on said second tracks prior to the step of interposing said separators.

19. The method of claim 16 and further including the step of:

storing said workpieces with said separators interposed therebetween prior to said step of removing said separators.

20. A method for conveying workpieces along a track from an upper vertical level to a lower vertical level under the influence of gravity by moving the workpieces with freely movable separators, said separators being mounted in a guide adjacent and parallel to said track, each of said separators having a projection, said track converging toward said guide at said upper level and diverging from said guide at said lower level; comprising the steps of:

freely circulating individual independently movable separators in said guide from said upper level to said lower level under the influence of gravity;

interposing the projection of one of said separators between adjacent workpieces at the area where said track converges toward said guide with said projections maintaining the workpieces in a spaced-apart relationship and conveying said workpieces by contact with said projections;

removing said separators from between said workpieces at the area where said track diverges away from said guide; and recirculating said separators to said upper level of said guide for resue.

21. The method as defined in claim 20, wherein said freely movable separators are circulated from said upper to said lower level by freely rolling under the influence of gravity.

22. A method for transferring workpieces along a first stationary track from an upper level to a lower level solely under the influence of gravity by moving said workpieces with individual undriven separators, said separatos each having a projection and being mounted in a second stationary track adjacent and parallel to said first track, comprising these steps of:

feeding and supporting said workpieces on said first stationary track;

supporting and guiding said undriven separators on said second track; and interposing the projection of only one of said separators between adjacent work pieces at said upper level for maintaining said work pieces in a spaced-apart relationship and for conveying said workpieces by contact with said projections.

23. In a conveyor system for transferring workpieces along a first stationary track from an upper level to a lower level, the improvement comprising:

a second helical track and an elevator defining a closed loop for supporting and guiding a plurality of separators, said second helical track having an intermediate portion adjacent and parallel to said first track, said separators freely movable along the intermediate portion of said second track from said upper level to said lower level;

a plurality of individual independently movable separators mounted in said closed loop; and means for recirculating said separators in said closed loop from said lower level to said upper level.

* * * * *